Patented Aug. 10, 1948

2,446,651

UNITED STATES PATENT OFFICE 2,446,651

PREPARATION OF ALPHA-AMINO-BETA-HYDROXY ALIPHATIC CARBOXYLIC ACIDS

Walter H. Hartung, Baltimore, Md.

No Drawing. Application December 7, 1944,
Serial No. 567,115

7 Claims. (Cl. 260—519)

This invention relates to a new process for preparing $\alpha$-amino-$\beta$-hydroxy aliphatic carboxylic acids and in particular it relates to a new process for preparing such compounds as serine and threonine.

Previous methods for preparing $\alpha$-amino-$\beta$-hydroxy aliphatic acids have been complicated and expensive. For example, serine has been synthesized by the Strecker method from glycolaldehyde and from ethoxyacetaldehyde by reaction with ammonia and hydrogen cyanide, by the reaction of ethyl formate with ethyl hippurate followed by reduction and hydrolysis, by the condensation of chloromethyl ether with ethyl sodiophthalimidomalonate and subsequent hydrolysis, and by the amination of $\alpha$-bromo-$\beta$-methoxypropionic acid followed by demethylation. Threonine has been obtained by the reaction of acetoacetic ester with nitrous acid followed by treatment of the resulting product with ethyl sulfate and then reduction and hydrolysis, and by the amination of $\alpha$-bromo-$\beta$-methoxybutyric acid or ester followed by demethylation. These methods of preparation require expensive and involved manipulations, entailing costly materials.

While it might appear that $\alpha$-halo-$\beta$-hydroxy aliphatic carboxylic acids or their derivatives might be aminated to form $\alpha$-amino-$\beta$-hydroxy aliphatic acids, this method has been found to suffer the defect that the reaction proceeds anomalously, at least in part, with the formation of $\beta$-amino-$\alpha$-hydroxy aliphatic carboxylic acids. For example, $\alpha$-chloro-$\beta$-hydroxypropionic acid yields entirely $\beta$-amino-$\alpha$-hydroxypropionic acid, which is known as isoserine. Further, $\alpha$-chloro-$\beta$-hydroxybutyric acid on similar treatment results in a mixture of $\alpha$-hydroxy-$\beta$-aminobutyric and $\alpha$-amino-$\beta$-hydroxybutyric acids. Therefore this method is unsuitable for the synthesis of pure $\alpha$-amino-$\beta$-hydroxy aliphatic carboxylic acids.

A method employing readily available and cheap materials is therefore desirable for the synthesis of amino acids of this type. It is the object of this invention to provide an economical means of preparing $\alpha$-amino-$\beta$-hydroxy aliphatic carboxylic acids. I have discovered that arylmethylamines, having the formula $ArCH_2NH_2$ where Ar is an aryl radical, react with $\alpha$-halo-$\beta$-hydroxy aliphatic carboxylic acids or their derivatives, such as amides, nitriles or esters, to form products in which the arylmethylamino groups are in the $\alpha$-position to the carboxyl group or its derived group. This reaction may be illustrated by the following equation:

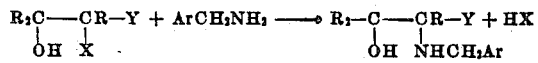

where R is a hydrogen or alkyl group, X is a halogen, Y is COOH, CONH$_2$, COOR, or CN, and Ar is an aryl radical.

This invention provides a method of preparing $\alpha$-(arylmethylamino)-$\beta$-hydroxy aliphatic carboxylic acids or their derivatives. It also provides a method of preparing $\alpha$-amino-$\beta$-hydroxy aliphatic carboxylic acids or their derivatives because the arylmethyl group may be removed from the amino group by reduction. This may be shown by the following equation:

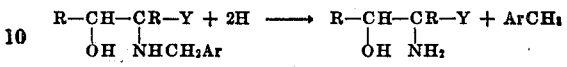

My invention having thus been disclosed is further illustrated by the following example. It will be apparent to those skilled in the art that various modifications may be made therein without departing from the spirit and scope of my invention herein disclosed and claimed. The following represents merely a preferred embodiment of my invention.

A. Two-tenths mole (17.5 g.) of methyl acrylate and two-tenths mole (28 g.) of potassium carbonate are dissolved in 400 cc. of water and cooled to 0° C. A cold solution of two-tenths mole (32 g.) of bromine and 0.55 mole (57 g.) of sodium carbonate in 500 cc. of water is added and the resultant mixture stirred for an hour, a temperature of 0° C. being maintained by the addition of crushed ice in small portions. The mixture is then made neutral to litmus by the addition of concentrated hydrochloric acid and allowed to stand overnight. The solution, yellow in color, is then transferred to a separator and extracted with ether, three portions of about 200 cc. each being used. The ether solution is dried over anhydrous sodium sulfate, filtered into a distilling flask, and the ether is evaporated by use of a warm water bath. The crude methyl $\alpha$-bromo-$\beta$-hydroxypropionate varies in color from light yellow to orange. Its boiling point by micro determination is 169° C. with decomposition.

This product gives a negative iodoform test, indicating the absence of any appreciable amount of $\alpha$-hydroxy compound. An iodoform test on lactic acid with the same reagents gives a strong positive test. On catalytic hydrogenation of a test sample, the product is debrominated and methyl hydracrylate results, providing additional evidence that any $\alpha$-hydroxy ester is absent.

B. One-tenth mole (18.3 g.) of methyl $\alpha$-bromo-$\beta$-hydroxypropionate is added with stirring to a solution of two-tenths mole (21.4 g.) of benzylamine in 200 cc. of ether. Benzylamine hydrobromide begins to separate immediately as colorless crystals, but the mixture is allowed to remain in a refrigerator overnight in order to precipitate completely all of the benzylamine salt. The crystals are then filtered off, washed with ether, dried, and weighed in order to determine whether all the excess benzylamine has been removed. To the yellow filtrate is added 50 cc. of alcoholic hydrogen chloride containing 0.1 g. HCl per cc., and the cloudy mixture is then placed in the refrigerator to stand overnight. The colorless platelets of N-benzyl-serine methyl ester hydrochloride which precipitate are then filtered off, washed with ether, and dried over soda lime in vacuo. They are quite hygroscopic. After careful drying, on analysis the product shows 5.649% nitrogen. Theoretical nitrogen content is 5.714%.

C. Four-tenths gram (0.002 mole) of methyl N-benzylserine hydrochloride is dissolved in 50 cc. 10% sodium hydroxide and warmed gently while stirring for three hours. The solution is cooled and carefully titrated to neutral with dilute hydrochloric acid. After cooling for two hours a white precipitate settles out. The crystals are filtered off, and dried over sulfuric acid in vacuo. Colorless crystals of N-benzylserine, melting at 134–5° C., are obtained. Nitrogen: calculated, 7.180%; found, 7.317%.

D. Four-tenths gram (0.002 mole) of N-benzylserine is dissolved in 50 cc. of absolute alcohol, and 3 g. palladium-on-charcoal catalyst is added; the mixture was then shaken with hydrogen at atmospheric pressure. The theoretical quantity of hydrogen, 45 cc., is taken up after six hours. The catalyst is then filtered off, most of the alcohol is removed under reduced pressure, and ether is added until a definite turbidity appears. After cooling the serine is filtered off. This product is then dissolved in a minimum of hot absolute alcohol and reprecipitated by the addition of dry ether. Colorless crystals melting at 223–4° C. result.

In the above example, instead of methyl α-bromo-β-hydroxypropionate, any ester of α-bromo-β-hydroxypropionic acid or other derivative of α-bromo-β-hydroxypropionic acid such as its nitrile or amide may be used successfully. Instead of a bromine-substituted compound, a chlorine- or iodine-substituted compound is also suitable. Further, other arylmethyl amines than the benzylamine are satisfactory, such as me-naphthylamine, $C_{10}H_7CH_2NH_2$, and p-phenyl-benzylamine. Instead of using palladium-charcoal catalyst, any of the noble metal catalysts is suitable for the hydrogenolysis. The hydrogenolysis of the benzyl group may precede the hydrolysis of the ester, as shown by the following example.

Eight grams (0.033 mole) of N-benzylserine methyl ester hydrochloride is dissolved in 100 cc. of absolute alcohol and 3 g. 10% palladium-on-charcoal catalyst added. The mixture is placed in a bomb and shaken with hydrogen at a pressure of 200 lbs./sq. in. Reduction is complete in 3 hours, and the catalyst is then filtered off. The filtrate is concentrated to about 50 cc. with the aid of reduced pressure and gentle warming. Ether is added to cause precipitation, and the mixture is cooled overnight. Colorless crystals of serine methyl ester hydrochloride are obtained, M. P. 112–4° C. Nitrogen: calculated, 9.033%; found, 9.188%.

The following experiment may be carried out to prove that the amino group of the serine is in the α-position to the carboxyl group. By reduction, the β-hydroxy group is removed and α-aminopropionic acid or α-alanine results.

One gram (0.0065 mole) of serine methyl ester hydrochloride, 20 cc. hydriodic acid (sp. gr. 1.50), and 0.3 g. red phosphorus are placed in a sealed tube and heated at 100° C. for twelve hours. The resulting solution is filtered and treated with a suspension of 10 g. lead oxide in 50 cc. water. The yellow lead iodide and excess lead oxide are filtered, and the colorless filtrate is treated with hydrogen sulfide until complete precipitation of lead is obtained. The lead sulfide is removed and the solution is concentrated to about 20 cc. by heating at 15 mm. pressure. Absolute alcohol is then added to precipitate the alanine. Colorless crystals of α-alanine, melting at 291° C., are obtained.

What I claim is:

1. The process which comprises: reacting a member of the group consisting of the lower alkyl esters of the alpha-halo-beta-hydroxy three- and four-carbon-atom aliphatic carboxylic acids with an amine having the formula $ArCH_2NH_2$, Ar being an aryl radical.

2. The process of claim 1, wherein the amine is benzyl amine.

3. The process for preparing an alpha-amino-beta-hydroxy aliphatic carboxylic acid containing three or four carbon atoms which comprises: reacting a member of the group consisting of the lower alkyl esters of the alpha-halo-beta-hydroxy three- and four-carbon-atom aliphatic carboxylic acids with an amine having the formula $ArCH_2NH_2$, Ar being an aryl radical, hydrolyzing the resulting ester to the corresponding carboxylic acid, and removing the $ArCH_2$ radical from the amino group of the product by hydrogenation in the presence of a noble metal hydrogenation catalyst.

4. The process of claim 3, wherein the acid is an alpha-halo-beta-hydroxybutyric acid.

5. The process of claim 3, wherein the acid is an alpha-halo-beta-hydroxypropionic acid.

6. A compound having the formula

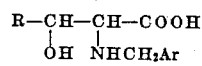

wherein R is selected from the group consisting of hydrogen and the methyl radical and Ar is an aryl radical.

7. N-benzylserine having the formula

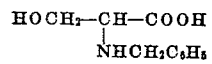

WALTER H. HARTUNG.

REFERENCES CITED

The following references are of record in the file of this patent:

UNITED STATES PATENTS

| Number | Name | Date |
|---|---|---|
| 2,231,360 | D'Ianni | Feb. 11, 1941 |
| 2,394,644 | Tuerck et al. | Feb. 12, 1946 |

OTHER REFERENCES

Darzens, Compt. rend. (Fr. Acad. Sci.) vol. 203, pp. 1375–1376 (1936).

Adkins, "Reactions of Hydrogen," (U. of Wisc. Press) pp. 87–89 (1937).

Frankland, Journal Chem. Soc. (London) vol. 99, pp. 1775–1783 (1911).

Patterson, et al., Jour. Biol. Chem., vol. 111, pp. 393–398 (1936).